United States Patent

Mimura

[11] Patent Number: 6,021,123
[45] Date of Patent: Feb. 1, 2000

[54] CELLULAR RADIO SYSTEM USING CDMA SCHEME

[75] Inventor: Masahiko Mimura, Tokyo, Japan

[73] Assignee: Kabushiki Kaisha Toshiba, Kawasaki, Japan

[21] Appl. No.: 08/789,102

[22] Filed: Dec. 27, 1996

[30] Foreign Application Priority Data

Dec. 27, 1995 [JP] Japan ................................ 7-341935

[51] Int. Cl.[7] .................................................. H04Q 7/00
[52] U.S. Cl. .................... 370/331; 370/332; 370/335; 455/436; 455/438
[58] Field of Search .................... 370/331, 332, 370/335, 333, 328; 455/436, 438, 439, 442, 443, 509, 516, 517, 524, 432, 560, 453, 446; 375/200

[56] References Cited

U.S. PATENT DOCUMENTS 5,487,083  1/1996  Nakajima et al. ................ 375/200
5,594,718  1/1997  Weaver, Jr. et al. ............... 370/331

*Primary Examiner*—Michael Horabik
*Assistant Examiner*—Binyam Tadesse
*Attorney, Agent, or Firm*—Banner & Witcoff, Ltd.

[57] ABSTRACT

In a CDMA cellular radio system a plurality frequencies of the system are divided into frequencies belonging to a first group and frequencies belonging to a second group, all of the frequencies of the first group are commonly assigned to all of the base stations BS1 to BSn and the frequencies of the second group are individually assigned to the base station groups BSa to BSc. The frequency in the first group is preferentially assigned to a mobile station MSj, and when the mobile station MSj moves between the cells of the different base station groups, soft handoff is effected by using the frequency in the first group. Further, the rates of use of channels of the respective assigned frequencies are monitored for the respective base stations BS1 to BSn, and when a frequency corresponding to the rate of use of the channel which has exceeded a threshold value is detected, the idle handoff control is effected with respect to the mobile station which uses the above frequency.

22 Claims, 14 Drawing Sheets

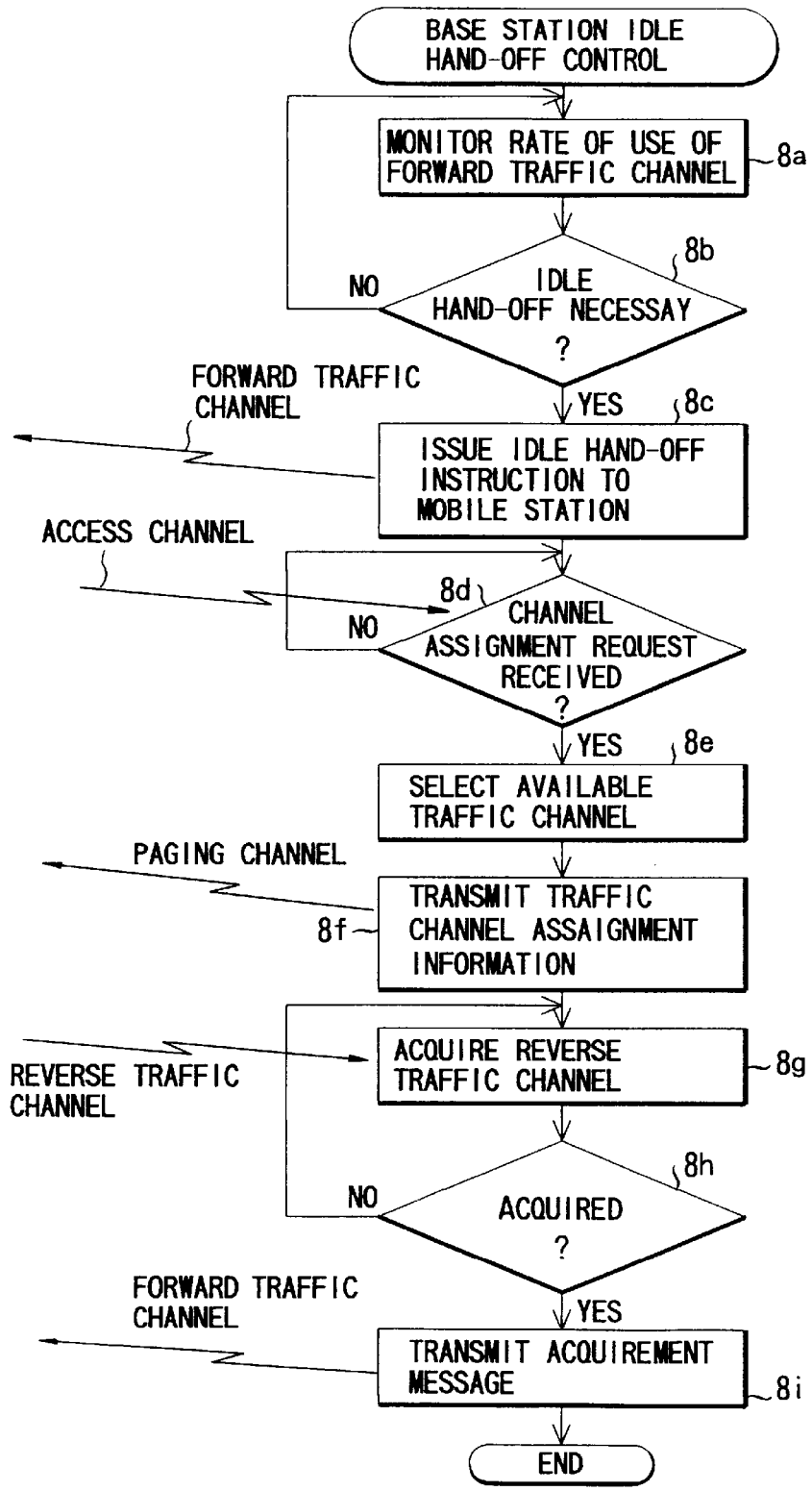
F I G. 9

CELLULAR RADIO SYSTEM USING CDMA SCHEME

BACKGROUND OF THE INVENTION

This invention relates to a mobile station device used in a digital cellular radio system such as a mobile telephone system or cordless telephone system, for example, and more particularly to a system utilizing a code division multiple access (CDMA) scheme as a radio access scheme with respect to a base station.

Recently, a spread spectrum communication system which is highly resistant to interference and disturbance has received much attention as one of the communication systems applied to a mobile communication system. The spread spectrum communication system is mainly used for realizing a cellular radio system utilizing a CDMA scheme.

The cellular radio system utilizing the CDMA scheme modulates digital audio data or image data in a device on the transmission side by use of a digital modulation system such as a PSK modulation system, for example, converts the modulated transmission data into a broad-band base band signal by use of a spread code such as a pseudorandom noise code (PN code), up-converts the frequency thereof to produce a signal of radio frequency band and transmits the same. On the other hand, a device on the reception side is so constructed as to down-convert the received signal of radio frequency band to produce a signal of intermediate frequency or base band frequency, subject the signal to the reverse spreading process by use of the same spread code as that used in the device on the transmission side, and then subject the signal to digital demodulation by use of a digital demodulation scheme such as a PSK demodulation scheme to reproduce reception data.

That is, the CDMA scheme is made to ensure channel separation between radio communications by allotting different spread codes to the radio communications between a plurality of mobile station devices and base stations.

FIG. 17 is a schematic construction diagram showing one example of a CDMA cellular radio system. In FIG. 17, a plurality of base stations BS1 to BSn are arranged in a service area, the base stations BS1 to BSn are connected to a control station CS via wire lines L1 to Ln, and the control station CS is connected to a wired communication network NW. The base stations BS1 to BSn constitute radio zones Z1 to Zn which are called cells and each of mobile stations MS1 to MSm is connected to one of the base stations which lies in a cell in which the corresponding mobile station now lies via a radio path by the CDMA scheme.

In the above system, if any one of the mobile stations MS1 to MSm moves between the cells while performing communication, so-called handoff for switching the base station to which the mobile station is connected via a radio path is performed. There are two types of handoffs: soft handoff and hard handoff.

The soft handoff is a system inherent to the CDMA cellular radio system. That is, at the time of handoff operation, the mobile station simultaneously creates a radio path between itself and a base station connected before the handoff and a radio path between itself and a base station to be connected after the handoff and makes a path diversity combination of signals received via the radio paths. After this, a base station to be connected is selected by cutting off one of the paths now subjected to the path diversity combination in which the intensity of the received electric field of the pilot channel is kept smaller than a threshold value for a preset period of time or more. Thus, the soft handoff has an advantage that the radio path selection can be smoothly made without causing hit (instantaneous interruption) of voice or the like since at least one of the two paths is always connected to a corresponding base station at the time of handoff and complete cut-off of the radio paths will not occur.

However, in order to effect the handoff, it is necessary to satisfy a condition that the base station connected before the handoff and the base station to be connected after the handoff use the same radio frequency. Therefore, for example, when the mobile station MSi moves from a cell of the station group BSa to another cell of the station group BSb or BSc in a system in which different radio frequencies f1, f2, f3 are respectively assigned to a plurality of base station groups BSa, BSb, BSc as shown in FIG. 17, the soft handoff cannot be effected.

On the other hand, the hard handoff is mainly effected in a case where application frequencies of the base station connected before the handoff and the base station to be connected after the handoff are different. That is, when it is required to change the radio frequency which the base station uses at the time of handoff, a message instructing the handoff is sent from the base station to the mobile station. When receiving the message, the mobile station temporarily interrupts the reception/transmission, creates a radio path newly allotted by the base station and starts the reception/transmission again by use of the radio path after creation of the radio path. That is, at the time of hard handoff, it is necessary to temporarily interrupt the radio path in order to change the radio frequency and newly create a radio path according to a new radio frequency.

However, in order to create the radio path between the mobile station and the base station, the mobile station first acquires a pilot channel which the base station uses for transmission so as to set up PN code synchronization. Then, after set-up of the PN code synchronization, the base station transmits synchronization information and control information by use of a sync channel and paging channel to the mobile station and then the mobile station transmits a message to the base station by use of an access channel in response to the received information. By the above signal transmission/reception, an available forward traffic channel is allotted from the base station to the mobile station, and if the mobile station can receive signals of a plurality of successive frames in good condition via the forward traffic channel, the communication state is set up between the base station and the mobile station.

Therefore, a relatively long time is required for newly creating a radio path at the time of handoff, and as a result, interruption of speaking voice or noise occurs in the process of handoff so as to degrade the speech quality. Further, a problem such as interruption of a call may occur by the failure of handoff.

BRIEF SUMMARY OF THE INVENTION

A first object of this invention is to provide a CDMA cellular radio system capable of enhancing the probability that the handoff can be effected and enhancing the speech quality.

A second object of this invention is to provide a CDMA cellular radio system capable of further enhancing the probability that the handoff can be effected by making an attempt to average or approximately equalize the traffic amounts of the respective radio frequencies.

In this invention, in order to attain the first object, a system comprises a plurality of base station groups each forming a plurality of cells by a plurality of base stations; and a mobile station connected to at least one of the plurality of base stations of the base station groups via a CDMA radio channel; wherein a plurality of radio frequencies of the system are divided into a first radio frequency group including at least one radio frequency and a second radio frequency group including a plurality of radio frequencies, the radio frequency of the first radio frequency group is commonly assigned to all of the base stations of the plurality of base station groups and the radio frequencies of the second radio frequency group are individually assigned to the plurality of base station groups. In a case where the radio frequency is assigned to the mobile station, the radio frequency belonging to the first radio frequency group is assigned in preference to the radio frequencies belonging to the second radio frequency group. When the mobile station moves from a coverage area of a first base station group to an area of another base station group, first handoff control means effects the control operation for soft handoff if the radio frequency assigned to the mobile station is the radio frequency belonging to the first radio frequency group and effects the control operation for hard handoff if the above radio frequency is a radio frequency belonging to the second radio frequency group.

In this system, each of the base station groups is assigned the common radio frequency in addition to the individual radio frequency and the common radio frequency is preferentially assigned to the mobile station when starting communication. Therefore, if the mobile station moves into the area of another base station group during communication, switching to the radio frequency which is the same as that used before the movement can be made. That is, soft handoff can be attained. As a result, interruption of speaking voice or noise will not occur and the speech quality can be kept high.

Further, in this invention, when the first handoff control means effects the control operation for soft handoff it is determined, whether the radio frequency assigned to to mobile station can be used with respect to the base station which the mobile station is entering. Then, if the radio frequency can be used, the soft handoff control is effected, and if the radio frequency cannot be used, the control operation for hard handoff to another usable radio frequency is effected.

With the above design, the following effect can be attained. Even if communication is made by using the radio frequency commonly assigned to the base station groups, there sometimes occurs a case wherein an available channel for the common radio frequency cannot be obtained in the base station which the mobile station is entering and the soft handoff cannot be effected, for example. However, in this case, the hard handoff to another radio frequency is effected. Therefore, interruption of speaking voice cannot be avoided by the hard handoff process, but the communication can be continuously maintained without fail.

Further, in this invention, when the first handoff control means effects the control operation for hard handoff, the use state of traffic channels of a plurality of radio frequencies which are treated as the candidates for the handoff are monitored, the radio frequency corresponding to a smallest one of the rates of use of traffic channels is selected based on the result of monitoring.

Thus, the handoff to a radio frequency which provides a large number of available channels can be smoothly effected and the soft handoff between cells in an area of the base station group which the mobile station is entering can be smoothly effected after the handoff.

Further, in this invention, when the first handoff control means effects at least one of the soft handoff control operation and the hard handoff control operation, first communication quality information obtained by weighting the intensity of a received electric field due to the radio frequency used with respect to the base station placed in the starting zone of movement by a coefficient corresponding to the rate of use of the traffic channel of the radio frequency is compared with second communication quality information obtained by weighting the intensity of received electric field due to the radio frequency to be used with respect to the base station placed in the destination of movement by a coefficient corresponding to the rate of use of the channel thereof and the handoff is effected based on the result of comparison.

In this case, even in the process of handoff control, the intensity of received electric field due to the radio frequency used with respect to the base station which is an object of the handoff becomes higher than the intensity of received electric field due to the radio frequency used with respect to the base station which is the source of the handoff, the handoff is not effected if the rate of use of the channel for the radio frequency used with respect to the base station which is the source of the handoff is high. That is, the handoff control is effected by taking not only the intensity of received electric field but also traffic into consideration.

Further, in order to attain the second object, in this invention, second handoff control means is provided and when a plurality of radio frequencies belong to the first radio frequency group, the rates of use of the traffic channels of the radio frequencies are monitored and the hard handoff control for averaging (approximately equalizing) the rates of use of the traffic channels thereof is effected with respect to the mobile station based on the result of monitoring by use of the second handoff control means.

As one example of the hard handoff control for averaging the traffic amounts, the following schemes are considered. That is, in one scheme, when a radio frequency corresponding to traffic of a predetermined amount or more is detected, the radio frequency of the mobile station to which the above radio frequency is assigned is changed to another radio frequency corresponding to a traffic amount less than the predetermined amount. In another scheme, when a difference between the traffic amounts for a plurality of radio frequencies becomes larger than a predetermined value, the radio frequency of the mobile station to which a radio frequency corresponding to the larger traffic amount is assigned is changed to another radio frequency corresponding to a less traffic amount.

By use of the above two handoff control means, if the traffic of the radio frequency assigned to the mobile station is increased while the mobile station stays in the cell of a desired base station, the handoff to another radio frequency corresponding to traffic of less amount is effected. That is, an attempt is made to average or approximately equalize the traffic amounts for the respective radio frequencies. Therefore, in the soft handoff control effected when the mobile station moves to another base station in the same base station group or to a base station in another base station group, problems arising from having a limited number of available channels in a coverage area which a mobile station is entering, can be suppressed and the probability that the soft handoff can be effected can be further enhanced. In addition, occurrence of the worst situation in which the call is interrupted by the failure of handoff can be prevented. Further, since the communication can be maintained by use of a radio frequency providing a sufficiently large number of available channels even after the handoff, adequate service of high speech quality can be offered.

The hard handoff control by the second handoff control means may be effected during the non-communication period of the mobile station, for example, during the reception waiting period or idling period, or during an operating period other than the speaking period. This makes it possible to average the traffic amounts for the respective radio frequencies while minimizing the bad influence the hard handoff has on the conversation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a flowchart for illustrating the control procedure for idle handoff in the base station and the contents thereof;

DETAILED DESCRIPTION OF THE INVENTION

Figure 1:
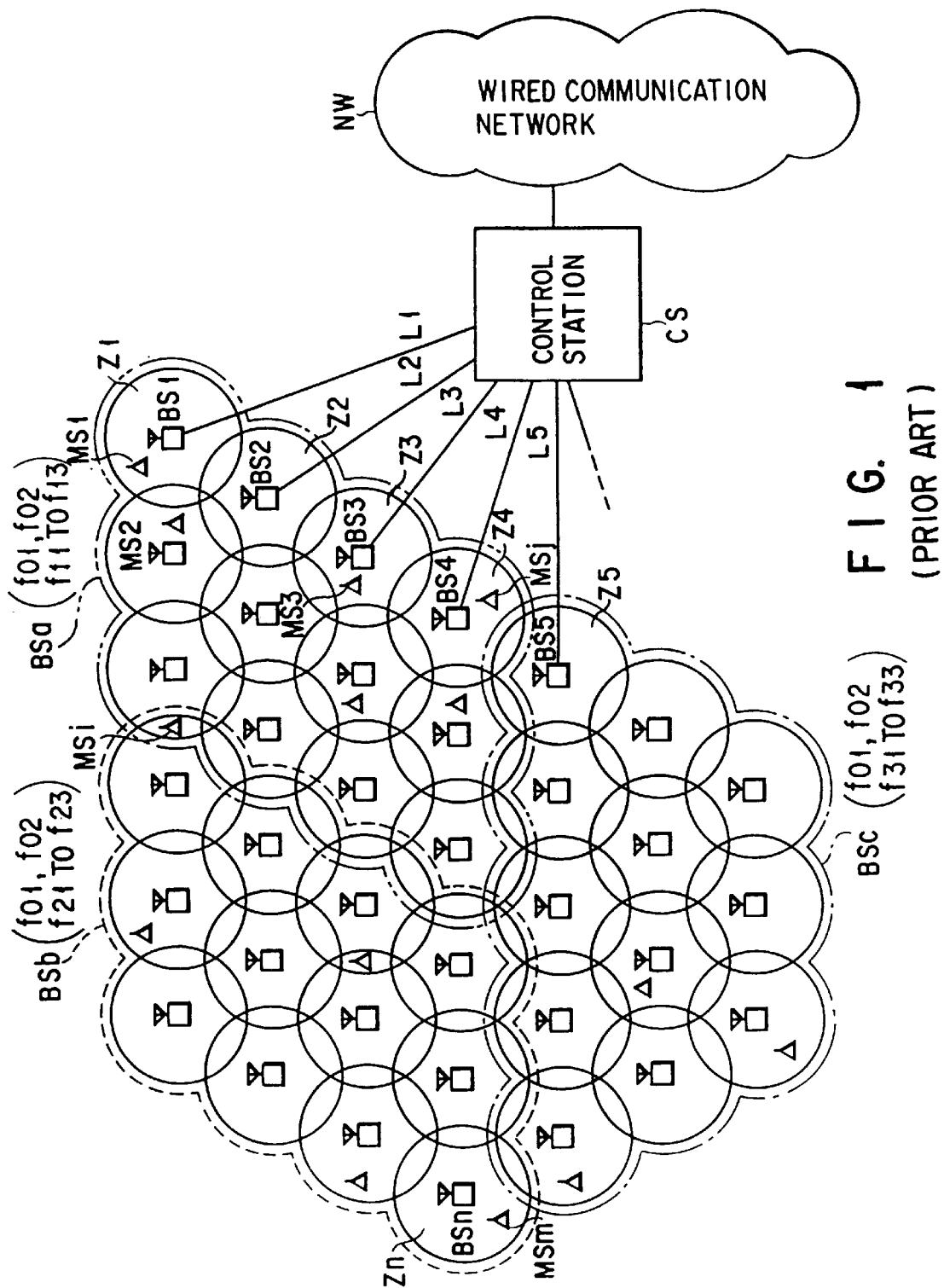
FIG. 1 is a schematic construction diagram showing one embodiment of a CDMA cellular radio system according to this invention.
Figure 17:
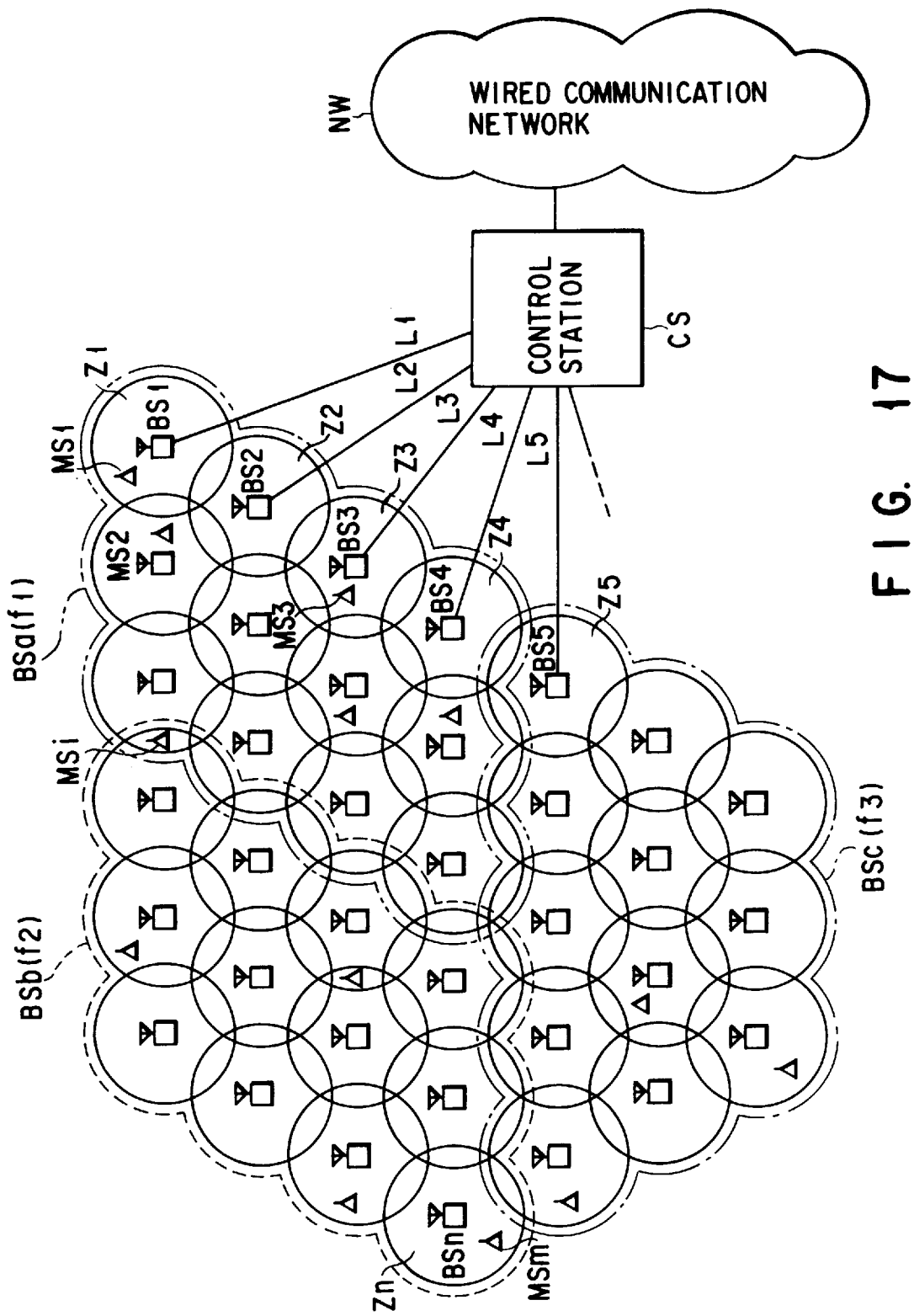
FIG. 17 is a schematic construction diagram showing one example of a conventional CDMA cellular radio system.

FIG. 1 is a schematic construction diagram showing one embodiment of a CDMA cellular radio system according to this invention. The apparent construction is the same as that shown in FIG. 17. However, the way of assigning radio frequencies to the base stations BSa to BSc and the handoff control function of the system are different from those of the system shown in FIG. 17 as explained below.

That is, the system of this invention has eleven radio frequencies in total. The radio frequencies are divided into a first radio frequency group and a second radio frequency group. The first radio frequency group includes two frequencies f01, f02 which are commonly assigned to the base station groups BSa to BSc. The second radio frequency group is constructed by three small groups each of which includes three frequencies f11 to f13, f21 to f23, or f31 to f33 and the small groups (f11 to f13), (f21 to f23), and (f31 to f33) are individually assigned to the three base station groups BSa to BSc. Each of the radio frequencies f01, f02, f11 to f13, f21 to f23, and f31 to f33 is constructed by an up (or reverse) frequency fU for transmitting a signal from the mobile station to the base station and a down (or forward) frequency fD for transmitting a signal from the base station to the mobile station.

The base station transmits a pilot channel, sync channel, paging channel and forward traffic channel in each forward frequency fD. The mobile station transmits an access channel and reverse traffic channel in each reverse frequency fU.

The system performs radio communication between the base station and the mobile station according to the CDMA scheme by selectively using the radio frequency of the first radio frequency group and the radio frequency of the second radio frequency group assigned to the base station. Various control operations relating to the radio communication include the mobile handoff control effected when the mobile station moves between the cells of the base stations and the idle handoff control effected when the traffic of a specified radio frequency is significantly increased in comparison with the traffic of another radio frequency assigned to the same base station.

Figure 2:
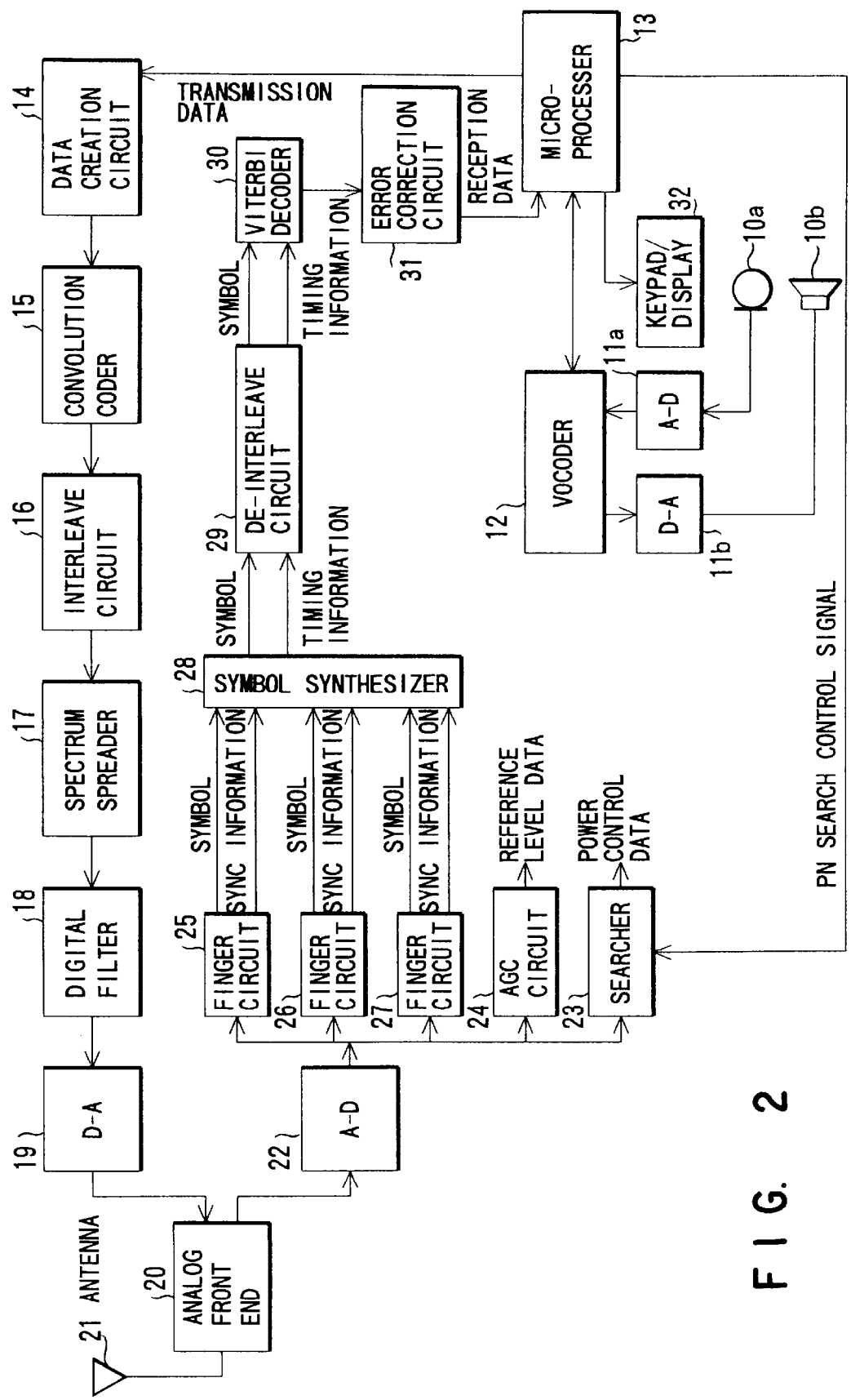
FIG. 2 is a circuit block diagram showing the construction of a mobile station of the system shown in FIG. 1.

FIG. 2 is a circuit block diagram showing the construction of a mobile station used in the above system.

A transmission speech signal of a speaker output from a microphone 10a is converted into a digital signal in an analog-digital converter (A-D) 11a and then coded in a speech coder-decoder (which is hereinafter referred to as a vocoder) 12. In a microprocessor (MPU) 13, a control signal and the like are added to a coded speech signal output from the vocoder 12 so as to create transmission data.

The transmission data is coded in a convolution coder 15 after an error detection code and error correction code are added thereto in a data creation circuit 14 and then the coded data is subjected to the process for interleaving by an interleave circuit 16. After this, the transmission data output from the interleave circuit 16 is subjected to the spectrum spreading process and converted into a wideband signal according to a PN code in a spectrum spreader 17. The transmission signal subjected to the spectrum spreading process is processed in a digital filter 18 to remove unnecessary frequency components and is then converted into an analog signal by a digital-analog converter (D-A) 19. The analog transmission signal is up-converted to a preset radio channel frequency in an analog front end 20 and power-amplified to a preset transmission power level and then transmitted from an antenna 21 towards the base station (not shown).

A radio signal received by the antenna 21 is subjected to the low noise amplification in the analog front end 20 and down-converted to an intermediate frequency or baseband frequency. Then, the reception signal output from the analog front end 20 is converted into a digital signal in a preset sampling period by an A-D converter (A-D) 22 and input to a search receiver (searcher) 23, automatic gain control (AGC) circuit 24 and three finger circuits 25, 26, 27.

The finger circuits 25, 26, 27 each include an initial acquisition section, clock tracking section and data demodulating section. The data demodulating section subjects the received transmission signal transmitted from the base station to the inverse spectrum spreading process and integrates the same for a period of one symbol in an integration damp filter. The reason why three finger circuits are provided is to receive a multipath reception signal with high SN ratio by using the path diversity effect and to effect so-called soft handoff for switching the base station to be connected without cutting off the radio channel during the communication.

The symbols demodulated by the finger circuits 25, 26, 27 are input to a symbol combiner 28 together with synchronization information and synthesized. The synthesized demodulated symbol is input to a de-interleave circuit 29 together with timing information and the de-interleaving process is effected in the de-interleave circuit 29. Next, the demodulated symbol after subjected to the de-interleaving process is subjected to the Viterbi decoding process in a Viterbi decoder 30, the demodulated symbol after subjected to the Viterbi decoding process is subjected to the error correction decoding process in an error correction circuit 31 and converted into reception data and input to the microprocessor 13. In the microprocessor 13, the input reception data is divided into speech data and control data. Among them, the speech data is subjected to the speech decoding process in the vocoder 12 and then converted into an analog signal in a D-A converter (D-A) 11b and then output from a speaker 10b.

A keypad/display 32 is provided to permit the user to enter dial data and control data or display various information items relating to the operating state of the mobile station. The operation of the keypad/display 32 is controlled by the microprocessor 13.

The searcher 23 searches for the PN code of the pilot signal broadcasted for each radio frequency from the base station and acquires the offset thereof and has basically the same construction as that of the finger circuits 25, 26, 27. Power control data obtained by the PN code searching operation is fetched by the microprocessor 13.

The microprocessor 13 has the starting control function, mobile handoff control function and idle handoff control function relating to this invention in addition to the normal various control functions relating to the operation of the mobile station.

The starting control function is started in response to the turn-ON of the power source switch of the mobile station, and an attempt is first made to select available radio frequencies from the radio frequencies f01, f02 of the first radio frequency group, and if no available radio frequency can be selected, an attempt is made to select available radio frequencies from the radio frequencies (for example, f11 to f13) of the second radio frequency group assigned to the base station of the cell in which the mobile station now lies. Then, the first radio path is created between the mobile station and the base station by using the radio frequency selected by the above attempts.

The mobile handoff control function is to effect the control operation for switching the first radio path connecting the mobile station and the base station to a second radio path for connection to a base station placed in the destination of movement in cooperation with the base stations when the mobile station moves from the cell of the base station in which the mobile station lies to the cell of an adjacent base station. At this time, if the radio frequency of the first radio path and the radio frequency of the second radio path are equal to each other, the soft handoff control is effected and if they are different, the hard handoff control is effected.

When the base station monitors the rates of use of the channels of radio frequencies assigned to the base station and detects that a radio frequency corresponding to the rate of use of the channel which exceeds a threshold value exists, the idle handoff control function effects the control operation for switching the radio path of the mobile station using the above radio frequency to a radio path of different radio frequency and the mobile station is operated in response to a handoff request from the base station.

The construction of each base station is substantially similar to that of the mobile station described above and is different from the latter in that plural sets of constructions each of which is the same as that shown in FIG. 2 are provided, a communication interface is used instead of the microphone 10a, speaker 10b, A-D 11a and D-A 11b of each set, the reception and transmission of information data and control data are effected via the communication interface and the microprocessor 13 has a control function as the base station.

Next, the operation of the system with the above construction is explained. In this explanation, a mobile station MSj lying in a cell Z4 of a base station BS4 is taken as an example.

Figure 3:
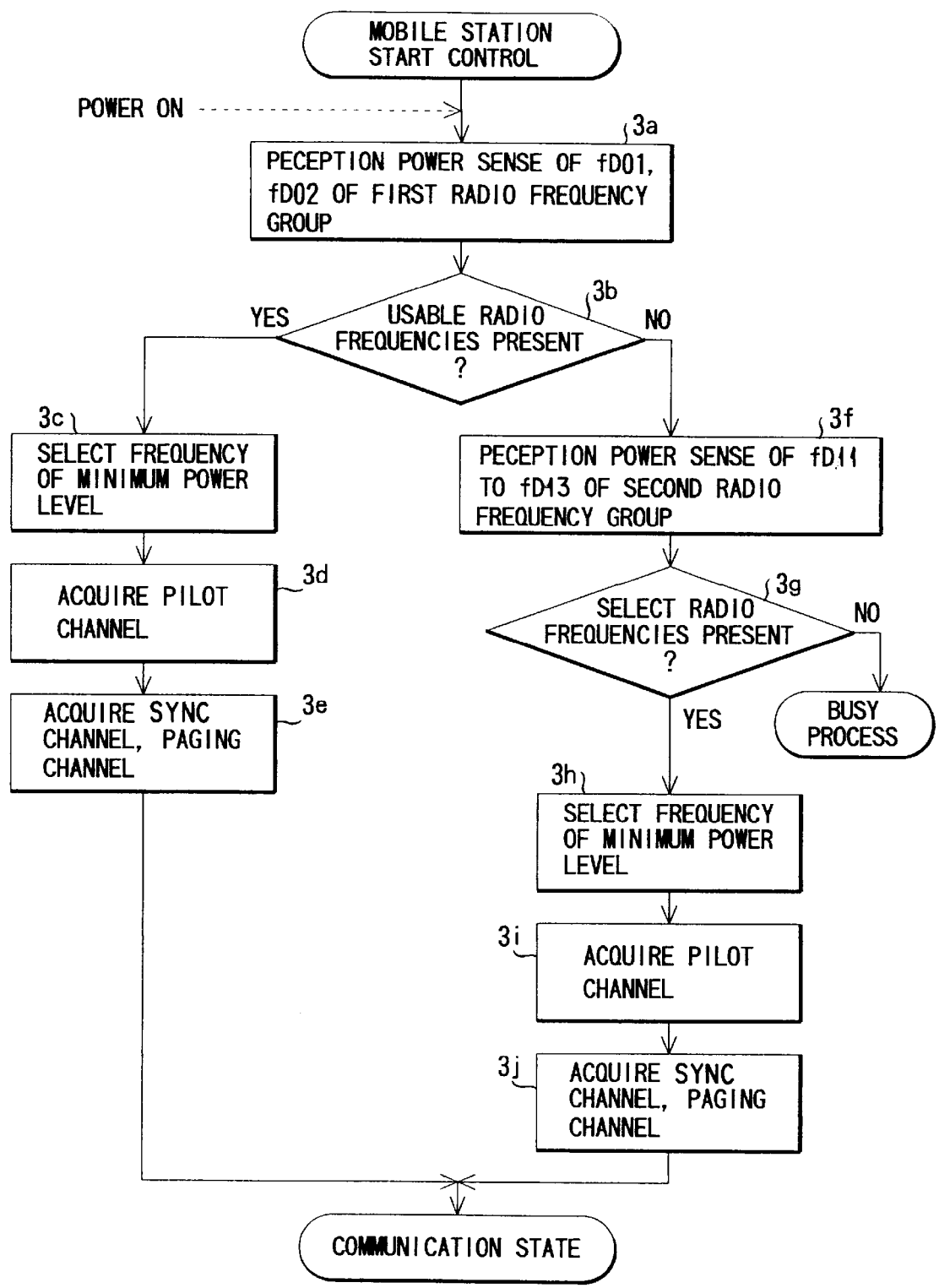
FIG. 3 is a flowchart for illustrating the starting control procedure of the mobile station shown in FIG. 2 and the contents thereof.
Figure 4:
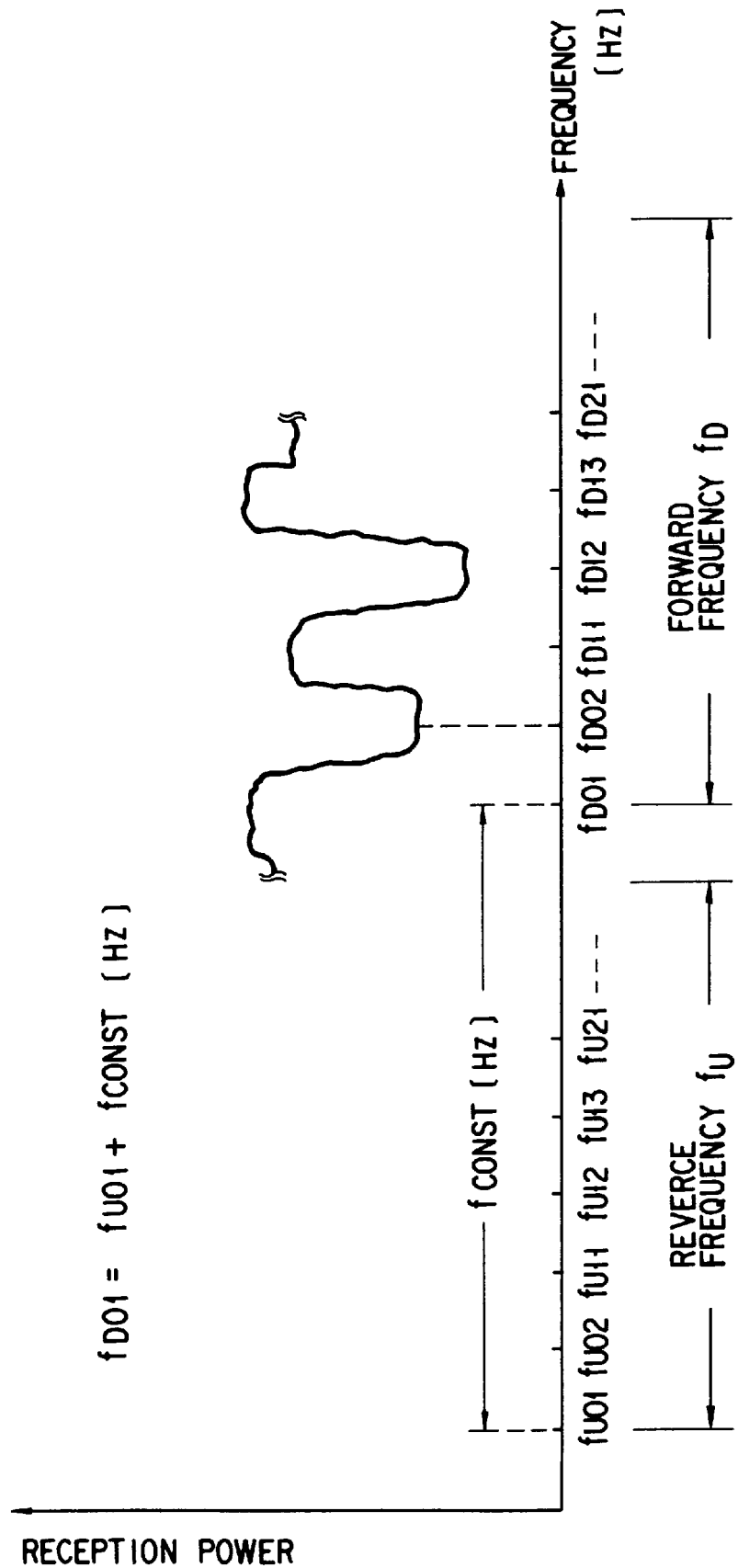
FIG. 4 is a diagram showing one example of the result of the power sensing process for forward frequencies.

First, the mobile station starting control effected when the power source switch is turned ON in the mobile station MSj is explained. FIG. 3 is a flowchart for illustrating the operation procedure of the control operation. When the power source switch is turned ON in the mobile station MSj, the power sensing process is first effected for forward frequencies fD01, fD02 of the radio frequencies f01, f02 belonging to the first radio frequency group in the step 3a. Then, whether or not the radio frequencies f01, f02 can be used is determined based on the result of power sensing process in the step 3b. If it is determined as the result of power sensing process that the radio frequencies f01, f02 can be used, the step 3c is effected to select one of the radio frequencies f01, f02 whose reception power level is lower. Assume now that the reception power level of the forward frequency fD02 is detected to be lower as shown in FIG. 4 as the result of power sensing process for the forward frequency, for example. Then, the forward frequency fD02 and a reverse frequency fU02 which makes a pair with the forward frequency fD02 are selected as frequencies to be used. The reason why the frequency with lower reception level is selected is that power of a reception signal other than the signal to the station acts as noise and gives a bad influence in the CDMA scheme and the probability that communication can be maintained without receiving interference becomes highest if the frequency with minimum power is selected.

After selecting the frequency to be used, the mobile station MSj acquires the pilot channel transmitted from the base station BS4 by use of the forward frequency fD02 in the step 3d. The pilot channel acquiring operation is effected by acquiring the phase and PN timing in the searcher 23. After the pilot channel is acquired, the mobile station MSj receives a sync channel in the step 3e, acquires information representing the system construction and system timing, acquires a paging channel and is then set into the idle state. That is, the mobile station MSj is set into the idle state by the forward frequency fD02 commonly assigned to all of the base stations.

Next, assume that the radio frequencies f01, f02 of the first radio frequency group cannot be received, for example, or the rate of use of the channel has exceeded the threshold value and they cannot be used. In this case, the mobile station MSj stops selecting the radio frequencies from the first radio frequency group and effects the step 3f to effect the power sensing process for the forward frequencies fD11 to fD13 of the radio frequencies f11 to f13 of the second radio frequency group. Then, whether the radio frequencies f11 to f13 can be used or not is determined based on the result of the power sensing process in the step 3g. If it is determined based on the result of the power sensing process that the radio frequencies can be used, the step 3h is effected to select the radio frequency corresponding to one of the forward frequencies fD11 to fD13 whose reception power level is lowest. After selecting the frequency to be used, the mobile station MSj acquires the pilot channel in the step 3i, receives a sync channel and acquires a paging channel in the step 3j, and is then set into the idle state. That is, in this case, the mobile station MSj is set into the idle state by the radio frequency of the second radio frequency group assigned only to the base station group BSa.

Figure 5:
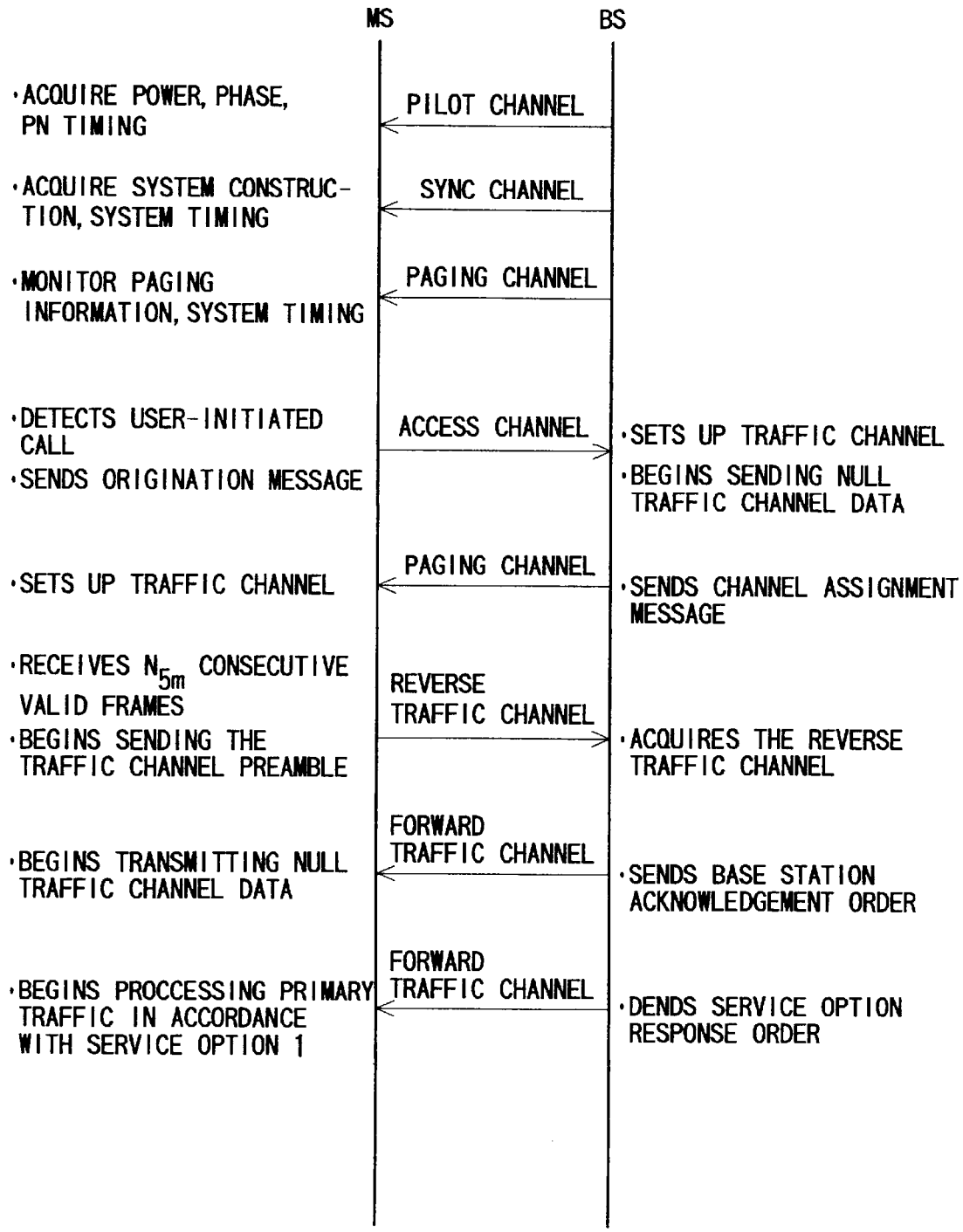
FIG. 5 is a sequence diagram showing the call setting procedure between the mobile station and the base station.

If the mobile station MSj issues a call in this state, the control process for call setting is effected according to a known sequence shown in FIG. 5 between the mobile station MSj and the base station BS4 and the mobile station MSj is set into a communication state in which it can communicate with the base station BS4 via the reverse traffic channel and forward traffic channel.

Figure 6:
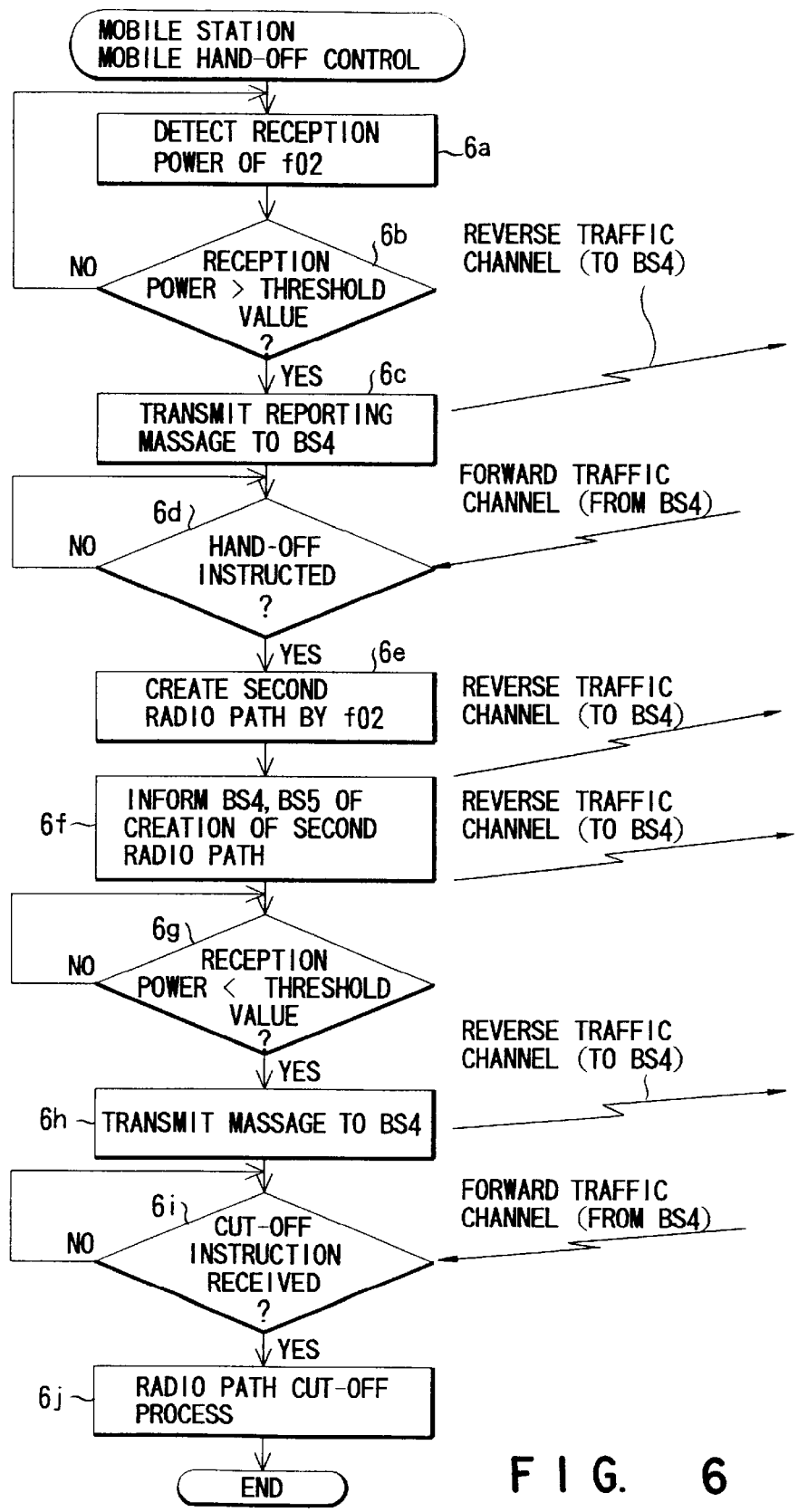
FIG. 6 is a flowchart for illustrating the control procedure for mobile handoff in the mobile station and the contents thereof.
Figure 7:
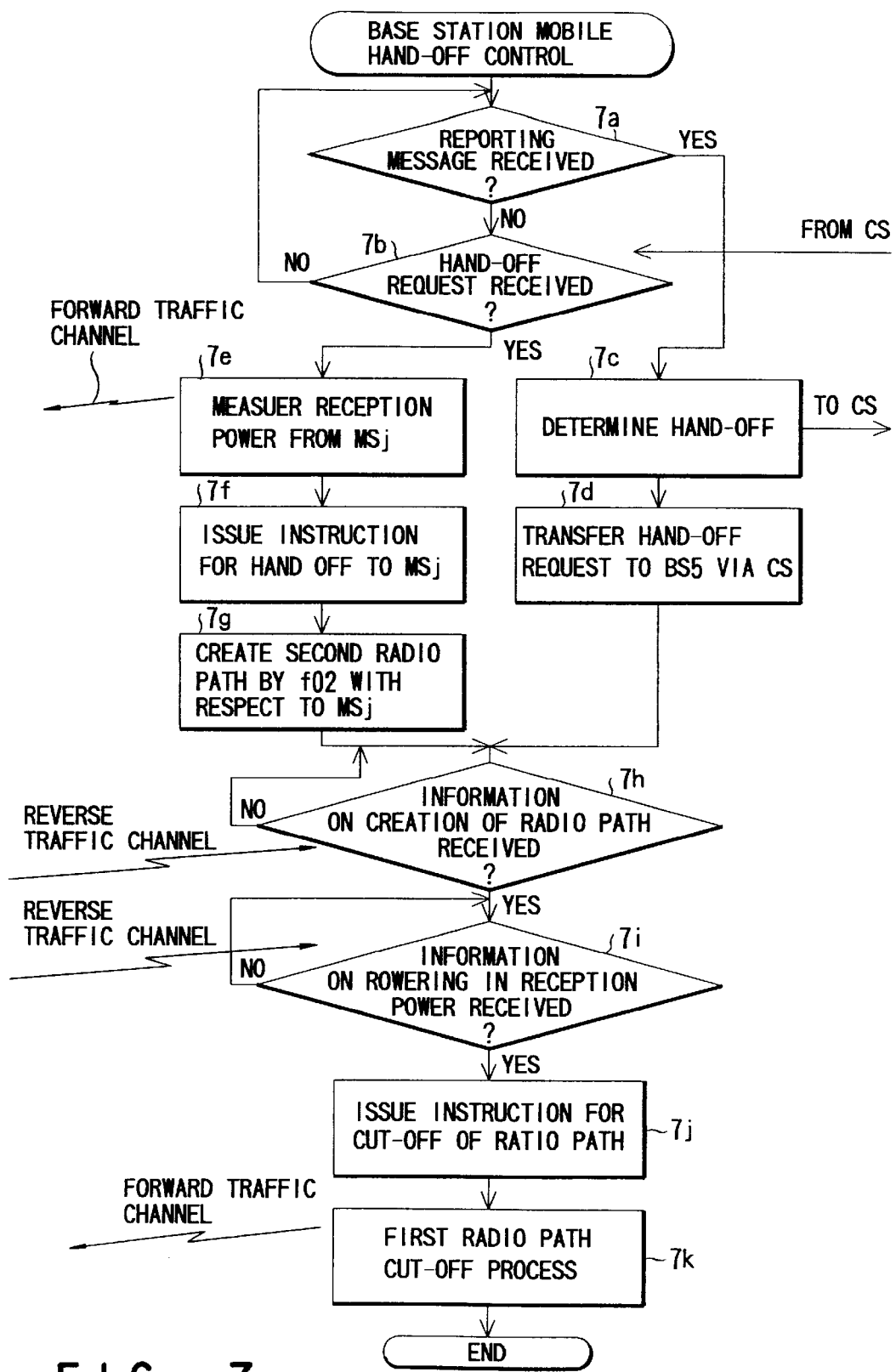
FIG. 7 is a flowchart for illustrating the control procedure for mobile handoff in the base station and the contents thereof.

Next, the mobile handoff control effected when the mobile station MSj set in the communication state moves between the cells is explained. FIGS. 6 and 7 are flowcharts showing the control procedures and the control contents of the mobile station MSj and the base stations BS1, BS2 for illustrating the control operation.

Figure 8:
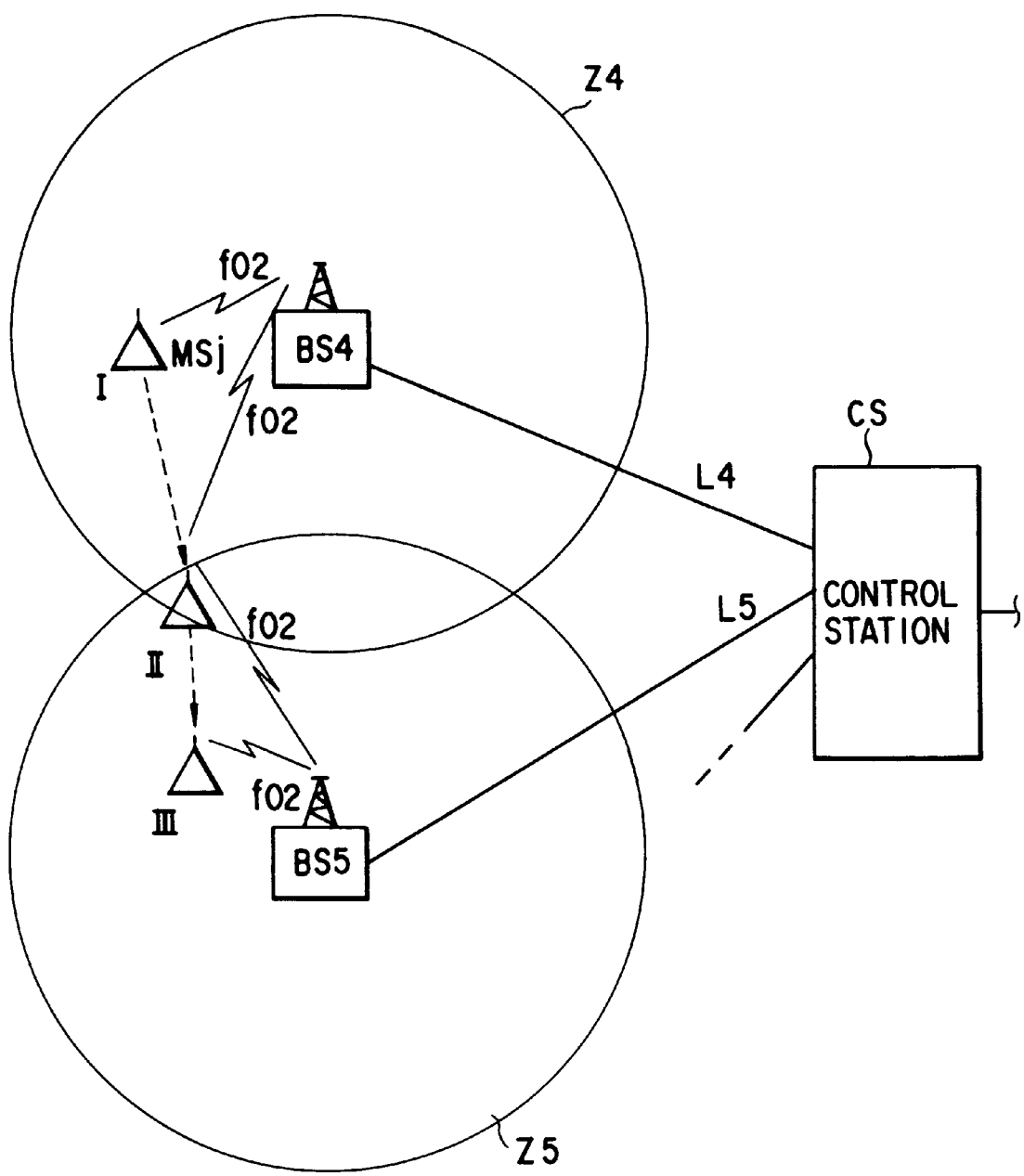
FIG. 8 is a diagram for illustrating the mobile handoff control.

For example, assume that the mobile station MSj has moved from the position in the cell Z4 indicated by I to the boundary position between the cells Z4 and Z5 indicated by II during the radio communication as shown in FIG. 8. Then, in the mobile station MSj, the reception level of the pilot channel transmitted from the base station BS5 becomes higher.

The mobile station MSj detects the reception power level of the pilot channel during the radio communication in the step 6a and compares the detected value with a plurality of threshold values previously set in the step 6b. Each time the reception power level of the pilot channel exceeds one of the threshold values, the phase of the PN code thereof and the reception power level of the pilot channel are sent to the base station BS4 which is now in communication with the mobile station in the step 6c.

The base station BS4 monitors arrival of the reception power level reporting message from the mobile station and a handoff request from another base station during the radio communication in the steps 7a and 7b. Then, if the reception level reporting message is received from the mobile station MSj in this state, it determines in the step 7c whether the handoff is necessary or not based on the reported reception level. If it is determined that the handoff is necessary, the base station BS4 identifies the base station BS5 which is an object of the handoff and transfers a handoff request towards the base station BS5 via the control station CS in the step 7d. Information representing the frequency now used is inserted into the handoff request.

When receiving the handoff request, the base station BS5 measures the reception level of the reverse traffic channel from the mobile station MSj in the step 7e. If it is determined based on the result of measurement that the handoff is necessary, the base station BS5 issues an instruction for the handoff to the mobile station MSj in the step 7f. At this time, the base station BS5 determines whether or not the radio frequency now used in the mobile station MSj belongs to the first radio frequency group. If it is determined that the above radio frequency belongs to the first radio frequency group, the soft handoff is selected as the handoff scheme. However, if the radio frequency now used in the mobile station MSj does not belong to the first radio frequency group, the hard handoff is selected as the handoff scheme and the result of selection is informed to the mobile station MSj.

In this example, since the mobile station MSj uses the radio frequency f02 belonging to the first radio frequency group as the radio frequency, the soft handoff is selected as the handoff system. Then, in the handoff step 7g, the base station BS5 effects the operation for creating a second radio path with respect to the mobile station MSj by using the same frequency f02 as that of the first radio path created with respect to the base station BS4 used before the handoff.

When receiving the instruction for the soft handoff from the base station BS5, the mobile station MSj changes the process from the step 6d to the step 6e to effect the operation for creating a second radio path by using the frequency f02. If the second radio path is created between the base station BS5 used after the handoff and the mobile station MSj, the mobile station MSj gives information that creation of the second radio path is completed to the base stations BS4, BS5 by use of the reverse traffic channel. The base stations BS4, BS5 receive and confirm information on completion of creation of the radio path from the mobile station MSj in the step 7h.

After this, in the mobile station MSj, the reception operation by path diversity simultaneously using the first radio path created with respect to the base station BS4 and the second radio path newly created with respect to the base station BS5 is effected.

During the reception operation by the path diversity, the mobile station MSj monitors the reception power levels of the pilot channels of the first radio path and second radio path in the step 6g. Assume that the mobile station MSj further moves from the position near the cell boundary indicated by II in FIG. 8 to the position in the cell Z5 indicated by III in this state. Then, the reception power level of the pilot channel of the first radio path is kept at a level lower than a preset threshold value for a preset period of time or more. Therefore, the mobile station MSj gives information on this situation to the base stations BS4, BS5 in the step 6h.

The base stations BS4, BS5 having received the above information change the process from the step 7i to the step 7j and transmits to the mobile station MSj a message instructing the mobile station MSj to cut off the first radio path on which the reception level of the pilot channel is lowered. When receiving the cut-off instruction, the mobile station MSj effects the process for cutting off the first radio path specified in the step 6j. Then, after cutting off the radio path, the mobile station informs the base station BS5 to this effect. At this time, in the base station BS4, the process for cutting off the first radio path between the base station and the mobile station MSj is effected in the step 7k.

Thus, the soft handoff in a case where the mobile station MSj moves from the cell Z4 of the base station BS4 to the cell Z5 of the base station BS5 is effected.

If the radio frequency which the mobile station MSj now uses is a radio frequency which does not belong to the first radio frequency group, the base stations BS4, BS5 determine that the radio frequency common in the system is not assigned to the mobile station MSj and effect the hard handoff control for the mobile station MSj.

Thus, since the frequency of the first radio frequency group commonly used by all of the base stations BS1 to BSn in the system is preferentially assigned to each mobile station, the probability that the soft handoff can be effected is enhanced when the mobile station now in communication moves between the cells of different base station groups BSa, BSb, BSc. Therefore, degradation in the communication quality due to the mobile handoff can be suppressed, and the handoff of high reliability can be smoothly effected by suppressing occurrence of failure of the handoff.

Further, in a case where no available channel is present in the traffic channels of the first frequencies in the cell of the destination of movement, for example, and the soft handoff cannot be effected, a frequency which can be used is selected and the hard handoff is effected. In this case, the communication quality will be degraded, but at least the failure of the handoff can be avoided.

Further, in the system of this embodiment, all of the frequencies are not commonly assigned to all of the base station groups BSa to BSc, but only some of the frequencies (frequencies f01, f02 of the first radio frequency group) which the system has are commonly assigned to all of the base station groups BSa to BSc. By this frequency assignment, like the conventional system shown in FIG. 17, for example, in a system in which different frequencies are individually assigned to the base station groups BSa to BSc, this invention can be realized simply by additionally assigning a new frequency which constructs the first radio frequency group to all of the base stations without changing the existing frequency assignment to the base station groups BSa to BSc. That is, this invention can be easily applied to existing systems which are now in practical use.

In the above description, the frequencies f01, f02 of the first radio frequency group which the base station groups BSa to BSc commonly use are preferentially assigned to any one of the mobile station, but it is possible to use another system. That is, the histories of movement of the mobile stations are monitored, the frequencies f01, f02 are selected from the first radio frequency group and assigned to the mobile station whose traveling distance in a preset past period of time is determined to exceed a threshold value based on the result of monitoring, and frequencies are selected from the second radio frequency group inherent to the base stations BSa to BSc and assigned to the mobile station whose traveling distance in a preset past period of time is determined to be equal to or smaller than the threshold value. As the method for monitoring the histories of movement, a method for counting the number of times of handoff between cells in a preset period of time may be used.

Further, it is possible to use a system in which the position of the mobile station at the time of turn-ON of the power source switch is determined, frequencies are selected from the first radio frequency group and assigned to the mobile station which lies in a cell near the area boundary of the base station groups BSa to BSc, and frequencies are selected from the second radio frequency group and assigned to the mobile station which lies in a cell other than the above-described cell, for example, a cell in or near the central portion of the area of the base station group.

By using the above systems, the frequencies of the first radio frequency group can be preferentially assigned to a mobile station which moves between the cells of the base station groups BSa to BSc with high probability. Therefore, it becomes possible to more effectively use the limited frequencies of the first radio frequency group.

Figure 10:
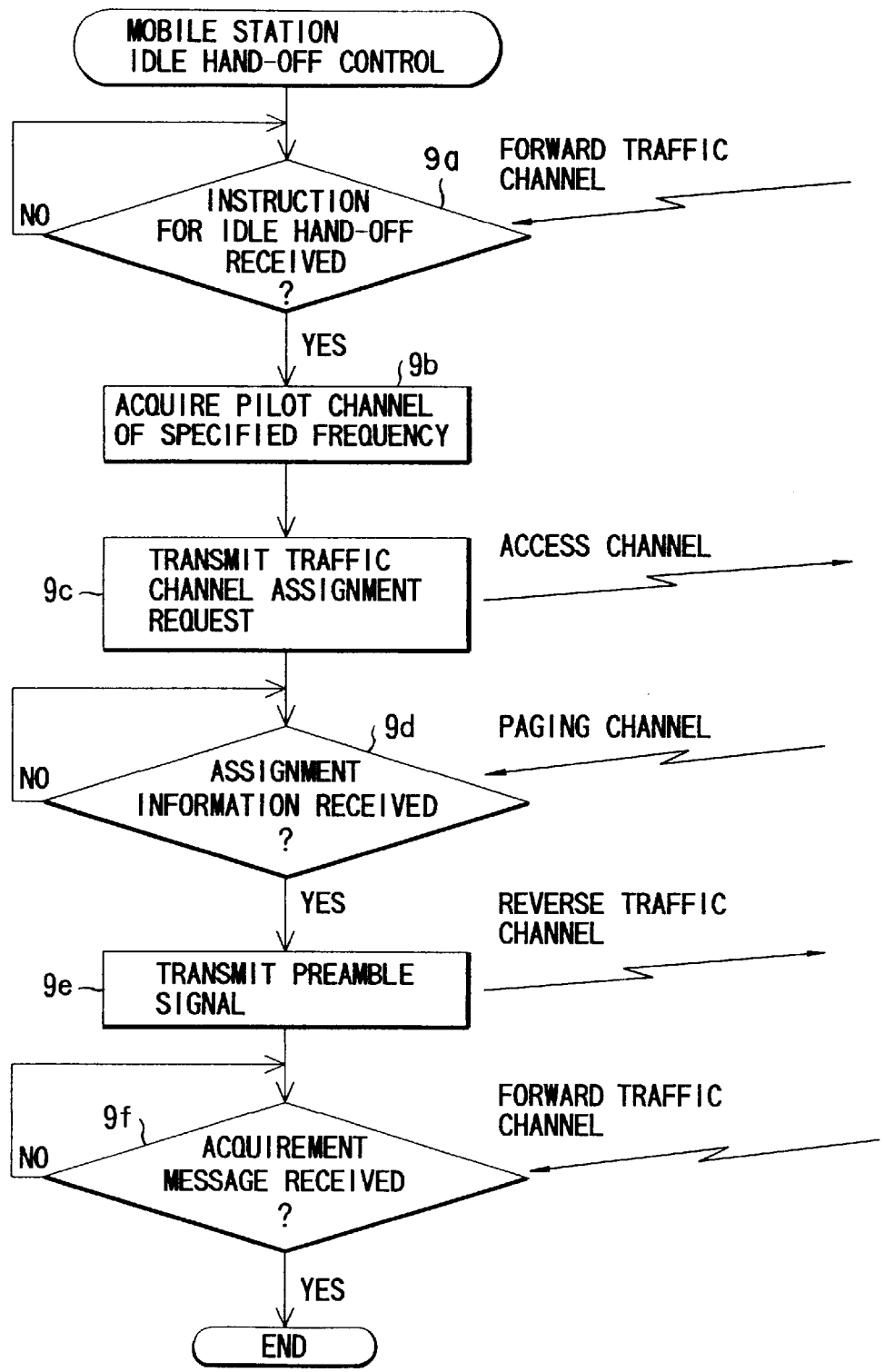
FIG. 10 is a flowchart for illustrating the control procedure for idle handoff in the mobile station and the contents thereof.

Next, the idle handoff control effected in a case where the traffic of a specified radio frequency increases in the base station is explained. FIGS. 9 and 10 are flowcharts showing the control procedure and control contents of the base station and the mobile station for illustrating the idle handoff control operation.

Each of the base stations BS1 to BSn monitors the rate of use of a forward traffic channel (which is hereinafter simply referred to as the "channel use rate") for radio frequency assigned to itself during the operation in the step 8a. The operation of monitoring the channel use rate is separately effected for the first radio frequency group and the second radio frequency group. Then, whether the idle handoff is necessary or not is determined based on the monitored result of use of the channel in the step 8b.

Figure 11:
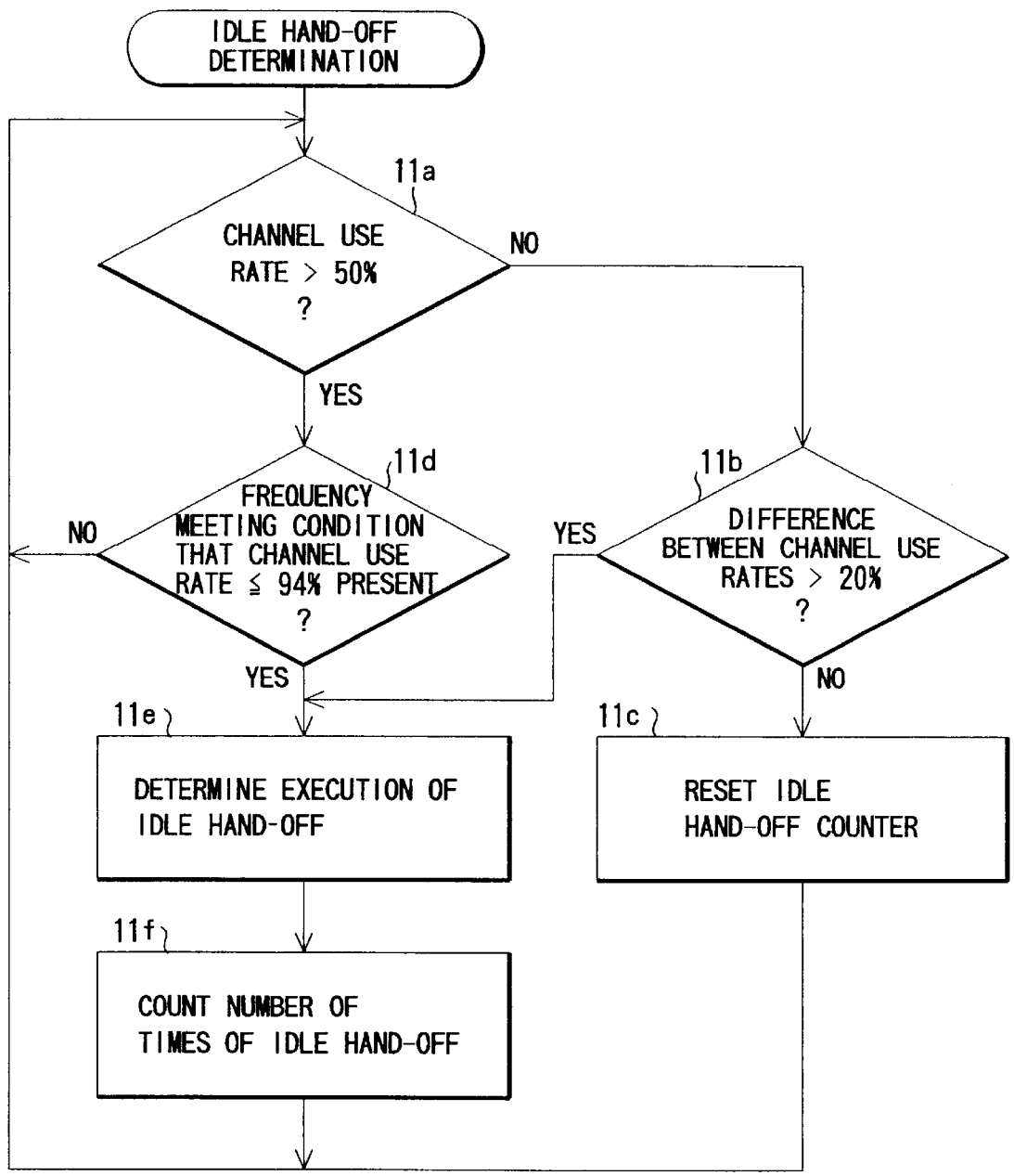
FIG. 11 is a flowchart showing the determination process for idle handoff.

FIG. 11 is a flowchart showing the procedure and processing contents of the above determining process. The base station determines in the step 11a whether a frequency corresponding to the channel use rate which is larger than a threshold value (95%) is present or not. If no such frequency is detected in the determining step, whether a frequency causing a difference between the channel use rates of the frequencies to exceed 20% is present or not is determined in the step 11b. If no such frequency is detected in the above determining step, it is determined that it is not necessary to effect the idle handoff, then the counter for counting the number of times of idle handoff is reset in the step 11c and the process is returned to the step 11a.

Figure 12:
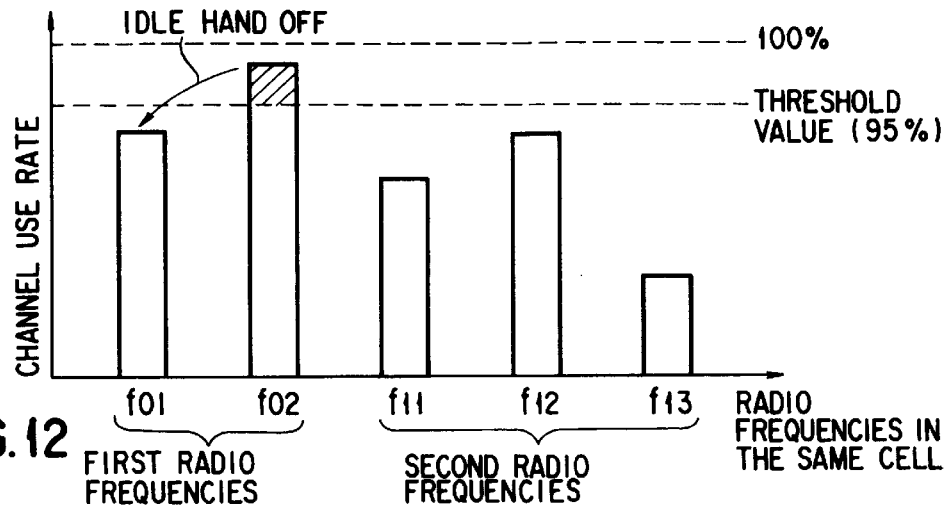
FIG. 12 is a diagram for illustrating one example of the idle handoff operation.

Assume now that, in this state, the channel use rate of the frequency f02 of the first radio frequency group exceeds 95% as shown in FIG. 12, for example. Then, the base station effects the step 11d to determine whether or not the channel use rate of the other frequency f01 of the first radio frequency group is not larger than 94%. If the channel use rate of the frequency f01 is not larger than 94% as shown in FIG. 12, for example, execution of the idle handoff is determined in the step 11e and the value of the counter for counting the number of times of idle handoff is incremented in the step 11f.

Figure 14:
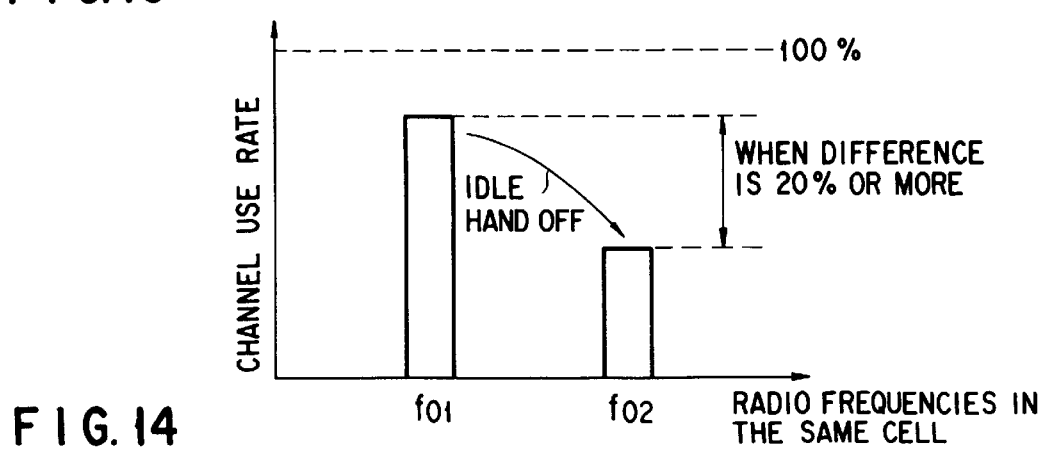
FIG. 14 is a diagram for illustrating still another example of the idle handoff operation.

Assume that a difference between the channel use rates for the two frequencies f01 and f02 of the first radio frequency group exceeds 20% as shown in FIG. 14, for example, even if there is no frequency corresponding to the channel use rate which exceeds 95%. Then, the base station effects the step 11e to determine execution of the idle handoff.

Figure 13:
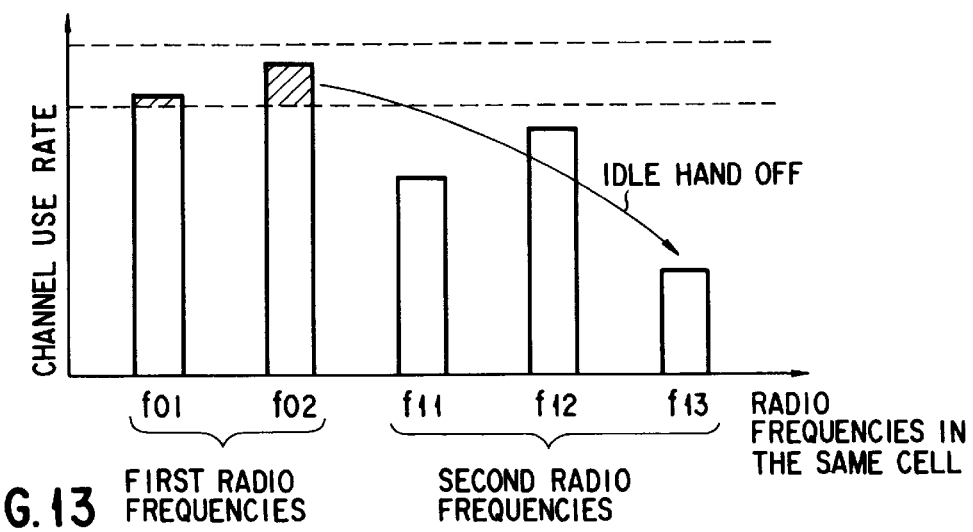
FIG. 13 is a diagram for illustrating another example of the idle handoff operation.

Further, if the channel use rates of the frequencies f01, f02 of the first radio frequency group both exceed 95% as shown in FIG. 13, for example, it is possible to select a frequency corresponding to the channel use rate which is equal to or less than 95% from the frequencies of the second radio frequency group and effect the idle handoff to the selected frequency. In this case, as a frequency to be selected, it is preferable to specify a frequency corresponding to the minimum channel use rate as shown in FIG. 13.

Further, only when a first frequency corresponding to the channel use rate exceeding 95% is present in a plurality of frequencies in the same cell and a second frequency which causes a difference in the channel use rate with respect to the first frequency to exceed 20% is also present, it is possible to permit execution of the idle handoff to the first frequency. In this case, as a frequency to be used after the handoff, it is preferable to select a frequency having a maximum difference in the channel use rate with respect to the first frequency.

If execution of the idle handoff is determined, the base station effects the step 8c as shown in FIG. 9 to instruct the mobile station which is an object of the handoff to execute the idle handoff. For example, an instruction for the idle handoff is transmitted to a desired mobile station MSj among a plurality of mobile stations now in communication via the forward traffic channel by using the frequency f02, for example. At this time, together with the instruction for the idle handoff, information representing the frequency f01 to be used after the handoff is also transmitted.

The mobile station MSj monitors arrival of the instruction for idle handoff from the base station BS4 in the step 9a during the communication. In this state, if the instruction for idle handoff is transmitted from the base station BS4, the step 9b is effected to acquire a pilot channel of the specified frequency f01 according to information on the frequency to be used after the handoff transmitted from the base station BS4. If the pilot channel is acquired, an access channel is used in the step 9c to transmit an assignment request of the traffic channel to the base station BS4.

If the channel assignment request is received from the mobile station MSj, the base station BS4 changes the process from the step 8d to the step 8e to select an available traffic channel on the frequency f01. Then, information for assigning the available traffic channel is transmitted to the base station BS4 which is the source of the channel assignment request by using the paging channel in the step 8f.

When receiving the channel assignment information, the mobile station MSj transmits a preamble signal by use of a reverse traffic channel of the specified frequency f01 in the step 9e. The base station BS4 receives the preamble signal transmitted from the mobile station MSj via the reverse traffic channel to acquire the reverse traffic channel in the step 8g. After acquiring the reverse traffic channel, the base station changes the process from the step 8h to the step 8i to transmit an acquirement message to the mobile station MSj.

When receiving the acquirement message in the step 9f, the mobile station MSj uses the newly assigned traffic channel of the frequency f01 and is then set into the idle state.

Thus, the channel use rates of the frequencies f01 and f02 of the first radio frequency group can be averaged or approximately equalized, and as a result, if an attempt is made to effect the soft handoff, occurrence of a problem that a sufficiently large number of available traffic channels cannot be obtained and the soft handoff cannot be effected can be prevented and the probability that the soft handoff can be successfully effected can be enhanced.

The number of mobile stations to which the instruction for idle handoff is issued is determined as follows. That is, the number of times of idle handoff for each frequency is counted by the counter, and if the count value reaches or exceeds 20, the number of mobile stations to which the instruction for idle handoff is issued is doubled. For example, if the instruction for handoff is issued to only one mobile station so far, the instruction for handoff is issued to two mobile stations after this. Further, if the count value reaches or exceeds 25, the number of mobile stations to which the instruction for idle handoff is issued is increased by four times.

Further, the number of mobile stations to which the instruction for idle handoff is issued may be determined according to the value of the present channel use rate of the frequency. At this time, it is preferable that the threshold value for determining the channel use rate can be variably set by the manual operation of a person in charge of the maintenance and management in the base station.

In the above explanation, determination of the idle handoff is made by use of the channel use rate, but determination of the idle handoff may be made by use of the number of traffic channels used.

If the idle handoff is effected for a mobile station which is not in communication, there is no possibility of degradation in the communication quality and it is convenient. However, in a case where such a mobile station which is not in communication is not present or only a small number of such mobile stations are present, the idle handoff can be effected for a mobile station which is now in communication. In this case, the hard handoff is effected to cause a possibility that the speech quality is degraded by hit of the speech or occurrence of noise. However, unlike the mobile handoff effected at the time of movement between the cells, the idle handoff is effected in a cell under a condition that the SN ratio of the reception signal is high, the PN code offsets used for the frequencies used before and after the handoff are the same and the PN code synchronization can be relatively easily attained. Therefore, the probability that the hard handoff is effected in failure is low and time required for a sequence of operations can be made short. As a result, degradation in the speech quality can be made extremely small.

This invention is not limited to the above embodiment. For example, the switching timing of the radio paths when the mobile handoff is effected can be controlled as follows. That is, switching from the first radio path used in the cell which is the starting zone of movement to the second radio path used in the cell which is the destination of movement is generally effected when it is detected that the reception power level of the second radio path becomes higher than the reception power level of the first radio path by comparing the reception power levels of the radio paths in the mobile station.

Figure 15:
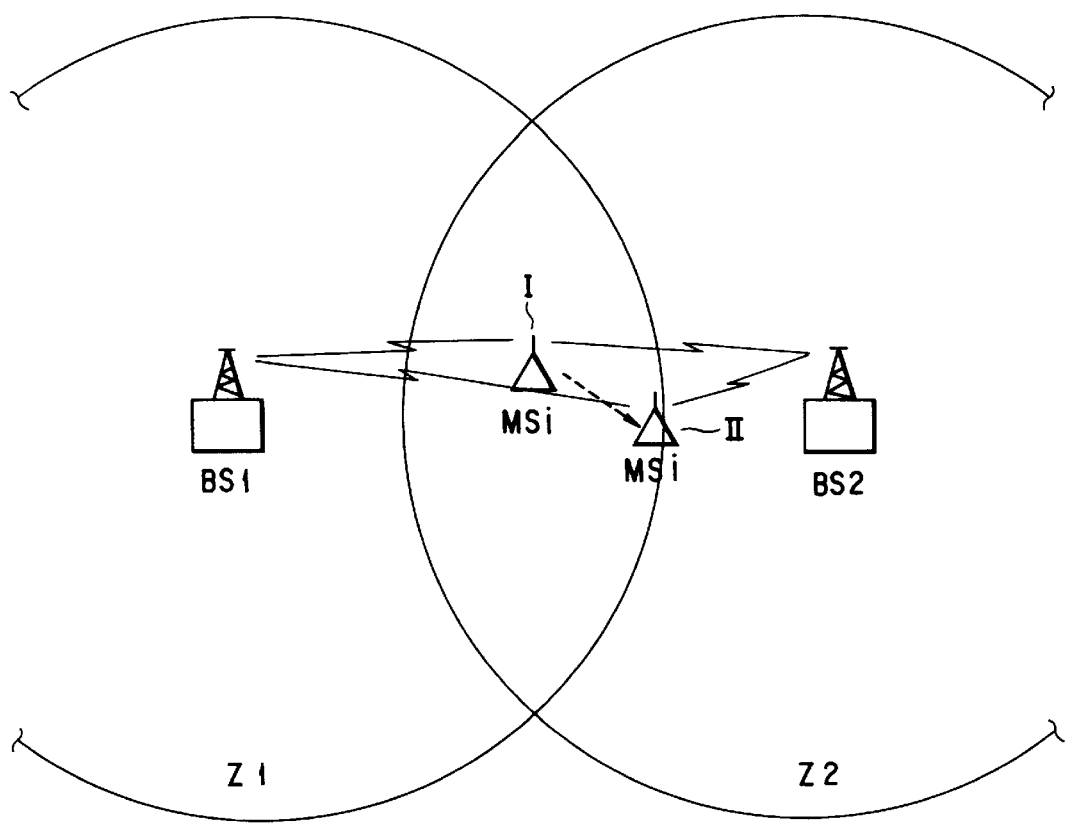
FIG. 15 is a diagram for illustrating another example of the mobile handoff operation.

However, in another embodiment of this invention, not only the reception power levels of the radio paths but also the traffics of the frequencies creating the radio paths are taken into consideration. For example, assume now that a mobile station MSi moves from a cell Z1 of the base station BS1 to a cell Z2 of the base station BS2 as shown in FIG. 15. In this case, the base stations BS1, BS2 start the handoff control when the mobile station BS1 comes closer to the boundary between the cells Z1 and Z2. Generally, the starting timing of the handoff control is early in the soft handoff case and late in the hard handoff case.

Figure 16:
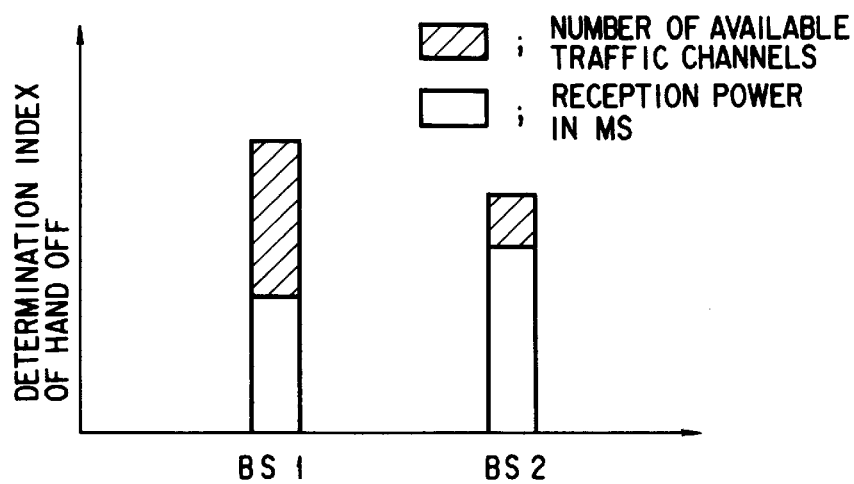
FIG. 16 is a diagram showing one example of a determination index used in the mobile handoff operation.

In the handoff control, the base stations BS1, BS2 detect the number of available traffic channels of the frequencies used for connection to the mobile station MSi and convert the detected number of available traffic channels into coefficients for weighting. Then, they add the above coefficients to the respective reception power levels of the first and second radio paths detected in the mobile station MSi. FIG. 16 shows an example of determination indices for the first and second radio paths after the addition. The base stations BS1, BS2 compare the determination indices. Then, when the determination index for the second radio path becomes larger than the determination index for the first radio path, the first radio path is cut off.

The above control operation can be applied to the soft handoff and hard handoff.

With the above operation, it is possible to effect the handoff control which is designed by taking into consideration not only the reception power levels of the first and second radio paths but also the traffics of the frequencies creating the above radio paths. Therefore, when the traffic of the frequency used in the cell which is the destination of movement is high, the handoff timing is delayed as much as possible so as to suppress an increase in the traffic of the frequency used in the cell which is the destination of movement. For example, in the case of FIG. 15, the switching of the radio paths is delayed until the mobile station MSi reaches close to the outermost end (position indicated by III) of the cell Z1. For example, when the handoff timing is determined based only on the result of comparison of the reception power levels, the radio path is switched when the mobile station MSi has reached the central portion (position indicated by II) of the boundary area in which the cell Z1 and the cell Z2 overlap.

Although, in the above-mentioned embodiment, explanation has been given about the case where the base stations form the cells of the same diameter, the above-mentioned same diameter is intended to mean that it contains a "difference" of a given range. The "difference" range is so defined that, for example, the maximum diameter cell does not exceed more than double the diameter of the minimum diameter cell.

Further, although, in the above-mentioned embodiment, one base station constitutes one cell, a plurality of (for example, 2) base stations may constitute one cell.

Further, the circuit constructions of the mobile station and base station, the control procedure of the mobile handoff and idle handoff and the control contents thereof can be variously modified without departing from the technical scope of this invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A CDMA cellular radio system which includes a plurality of base station groups each including a plurality of cells formed by a plurality of base stations, and a mobile station connected to at least one of said plurality of base stations of the base station groups via a CDMA radio channel, and in which a plurality of radio frequencies are divided into a first radio frequency group including at least one radio frequency and a second radio frequency group including a plurality of radio frequencies, the at least one radio frequency of the first radio frequency group being commonly assigned to all of the base stations of said plurality of base station groups and the radio frequencies of the second radio frequency group being individually assigned to said plurality of base station groups, comprising:

radio frequency assigning means for assigning a radio frequency belonging to the first radio frequency group to the mobile station in preference to the radio frequencies belonging to the second radio frequency group; and first handoff control means for effecting a control operation for soft handoff if a radio frequency assigned to the mobile station belongs to the first radio frequency group when the mobile station moves from a coverage area of a first base station group to a coverage area of a second base station group, and effecting a control operation for hard handoff if the radio frequency assigned to the mobile station belongs to the second radio frequency group when the mobile station moves from the coverage area of the first base station group to the coverage area of the second base station group.

2. A CDMA cellular radio system according to claim 1, wherein said first handoff control means determines whether the radio frequency assigned to the mobile station is available in a coverage area which the mobile station is entering, and said first handoff control means effects the soft handoff control if the radio frequency assigned to the mobile station is available in the coverage area which the mobile station is entering, and said first handoff control means effects the control operation for hard handoff to another radio frequency if the radio frequency assigned to the mobile station is not available in the coverage area which the mobile station is entering.

3. A CDMA cellular radio system according to claim 1, wherein said first handoff control means monitors the traffic amounts of a plurality of radio frequencies which are candidates for handoff, selects a radio frequency with a smallest traffic amount based on the result of monitoring and effects the control for the hard handoff to the selected radio frequency when said first handoff control means effects the control operation for hard handoff.

4. A CDMA cellular radio system according to claim 1, wherein when said mobile station moves from a coverage area of a first base station to a coverage area of a second base station, said first handoff control means compares first communication quality information obtained by weighting information representing a signal strength of a first radio path between the mobile station and the first base station by a coefficient corresponding to a traffic amount of the first radio path with second communication quality information obtained by weighting information representing a signal strength of a second radio path between the mobile station and the second base station by a coefficient corresponding to a traffic amount of the second radio path, and then determines handoff timing based on the result of comparison, when said first handoff control means effects at least one of the soft handoff control operation and the hard handoff control operation.

5. A CDMA cellular radio system according to claim 1, further comprising second handoff control means for monitoring traffic amounts of a plurality of radio frequencies belonging to the first radio frequency group and effecting the hard handoff control for averaging the traffic amounts of said plurality of radio frequencies belonging to the first radio frequency group based on the result of monitoring.

6. A CDMA cellular radio system according to claim 5, wherein when a traffic amount of one of said plurality of radio frequencies belonging to the first radio frequency group exceeds a predetermined value, said second handoff control means effects the hard handoff control for assigning a different radio frequency to said mobile station, wherein a traffic amount of said different radio frequency is less than the predetermined value.

7. A CDMA cellular radio system according to claim 5, wherein when said mobile station is assigned a first radio frequency of said first radio frequency group, and a traffic amount of said first radio frequency exceeds a traffic amount of a second radio frequency of said first radio frequency group by a predetermined value, said second handoff control means effects the hard handoff control for assigning the second radio frequency to the mobile station.

8. A CMDA cellular radio system according to claim 5, 6 or 7, wherein said second handoff control means effects the hard handoff control in a non-communication period of the mobile station.

9. A CDMA cellular radio system which includes a plurality of base station groups each including a plurality of cells formed by a plurality of base stations, and a mobile station connected to at least one of said plurality of base stations via a CDMA radio channel and in which a plurality of radio frequencies are divided into a first radio frequency group including a plurality of radio frequencies and a second radio frequency group including a plurality of radio frequencies, the radio frequencies of the first radio frequency group being commonly assigned to all of the base stations of said plurality of base station groups, and the radio frequencies of the second radio frequency group being individually assigned to said plurality of base station groups, comprising:

radio frequency assigning means for assigning a radio frequency belonging to the first radio frequency group to the mobile station in preference to radio frequencies belonging to the second radio frequency group; and handoff control means for monitoring traffic amounts of said plurality of radio frequencies belonging to the first radio frequency group and effecting the hard handoff control for averaging the traffic amount of said plurality of radio frequencies belonging to the first radio frequency group with respect to the mobile station based on the result of monitoring.

10. A CDMA cellular radio system which includes a plurality of base station groups each including a plurality of cells formed by a plurality of base stations, and a mobile station connected to at least one of said plurality of base stations of the base station groups via a CDMA radio channel and in which a plurality of radio frequencies are divided into a first radio frequency group including at least one radio frequency and a second radio frequency group including a plurality of radio frequencies, the at least one radio frequency of the first radio frequency group being commonly assigned to all of the base stations of said plurality of base station groups, and the radio frequencies of the second radio frequency group being individually assigned to said plurality of base station groups, comprising:

monitoring means for monitoring movement of the mobile station;

estimating means for estimating a probability that the mobile station will move from a coverage area of a first base station group to a coverage area of a second base station group based on the result of monitoring by said monitoring means;

radio frequency assigning means for assigning the at least one radio frequency belonging to the first radio frequency group to the mobile station if the mobile station is estimated to have a high probability of moving into the coverage area of the second base station group by said estimation means, and assigning a radio frequency belonging to the second radio frequency group to the mobile station if the mobile station is estimated to have a low probability of moving into the coverage area of the second base station group; and first handoff control means for effecting a control operation for soft handoff if a radio frequency assigned to the mobile station is the at least one radio frequency belonging to the first radio frequency group when the mobile station moves from the coverage area of the fix base station group to the coverage area of the second base station group, and effecting a control operation for hard handoff if the radio frequency assigned to the mobile station is a radio frequency belonging to the second radio frequency group when the mobile station moves from the coverage area of the first base station group to the coverage area of the second base station group.

11. A CDMA cellular system according to claim 10, wherein said monitoring means monitors a speed of the mobile station, and said estimating means estimates that the probability of the mobile station moving into the coverage area of the second base station group is high when the speed of the mobile unit station exceeds a predetermined value and estimates that the probability of the mobile station moving into the coverage area of the second base station group is low when the speed of the mobile station does not exceed the predetermined value.

12. A CDMA cellular system according to claim 10, wherein said monitoring means monitors a position of the mobile station in a coverage area of each of the base station groups, and said estimating means determines whether the position of the mobile station is within a predetermined distance from a coverage area of another base station group, estimates that the probability of the mobile station moving into the coverage area of the second base station group is high when the detected position is determined to be within the predetermined distance, and estimates that the probability of the mobile station moving into the coverage area of the second base station group is low when the position is determined to be not within the predetermined distance.

13. A CDMA cellular system according to claim 10, wherein said first handoff control means determines whether a radio frequency assigned to the mobile station is available in a coverage area which the mobile unit is entering, and said first handoff control means effects the soft handoff control if the radio frequency assigned to the mobile station is available in the coverage area which the mobile unit is entering, and effects the control operation for hard handoff to another radio frequency if the radio frequency assigned to the mobile station is not available in the coverage area which the mobile unit is entering.

14. A CDMA cellular system according to claim 10, wherein said first handoff control means monitors traffic amounts of a plurality of radio frequencies which are candidates for handoff, selects a radio frequency corresponding to a smallest traffic amount based on the result of monitoring, and effects the control for the hard handoff to the selected radio frequency when said first handoff control means effects the control operation for hard handoff.

15. A CDMA cellular system according to claim 10, wherein when said mobile station moves from a coverage area of a first base station to a coverage area of a second base station, said first handoff control means compares first communication quality information obtained by weighting information representing a signal strength of a first radio path between the mobile station and the first base station by a coefficient corresponding to a traffic amount of the first radio path with second communication quality information obtained by weighting information representing a signal strength of a second radio path between the mobile station and the second base station by a coefficient corresponding to a traffic amount of the second radio path, and then determines handoff timing based on the result of comparison, when said first handoff control means effects at least one of the soft handoff control operation and the hard handoff control operation.

16. A CDMA cellular system according to claim 10, further comprising second handoff control means for monitoring traffic amounts of a plurality of radio frequencies belonging to the first radio frequency group and effecting the hard handoff control for averaging the traffic amounts of said plurality of radio frequencies belonging to the first radio frequency group based on the result of monitoring.

17. A CDMA cellular system according to claim 16, wherein when a traffic amount of one of said plurality of radio frequencies belonging to the first radio frequency group exceeds a predetermined value, said second handoff control means effects the hard handoff control for assigning a different radio frequency to said mobile station, wherein a traffic amount of said different radio frequency is less than the predetermined value.

18. A CDMA cellular system according to claim 16, wherein said mobile station is assigned a first radio frequency of said first radio frequency group, and a traffic amount of said first radio frequency exceeds a traffic amount of a second radio frequency of said first radio frequency group by a predetermined value, said second handoff control means effects the hard handoff control for assigning the second radio frequency to the mobile station.

19. A CDMA cellular system according to claim 16, 17 or 18, wherein said second handoff control means effects the hard handoff control in a non-communication period of the mobile station.

20. A radio communications apparatus for use in a CDMA cellular radio system including a plurality of base station groups each including a plurality of cells formed by a plurality of base stations, wherein a first radio frequency group includes at least one radio frequency and a second frequency group includes a plurality of radio frequencies and the at least one radio frequency of the first radio frequency group is commonly allocated to all of the base station groups and the radio frequencies of the second radio frequency group a individually allocated to the plurality of base station groups, comprising:

first frequency selection means for selecting an available radio frequency from the first radio frequency group in accordance with turning ON of a power source; and second frequency selection means for, if a radio frequency from the first radio frequency group cannot be selected by the first frequency selection means, selecting an available radio frequency from the second radio frequency group allocated to the base station of a cell where a mobile station is situated, wherein a radio path is created from the mobile station to the base station of the cell where the mobile station is situated through the use of a radio frequency selected by the first frequency selection means or second frequency selection means.

21. A radio communications apparatus according to claim 20, further comprising:

receiving means for receiving a handoff request sent from a base station; and handoff control means for, if a radio path is created by the radio communication apparatus from the mobile station to a base station through the use of a radio frequency exceeding a predetermined channel use rate, effecting control in response to receiving the handoff request by the receiving means to change the radio frequency used for the radio path to a different radio frequency.

22. A CDMA cellular radio system which includes a plurality of base station groups each including a plurality of cells formed by a plurality of base stations, and a mobile station connected to at least one of said plurality of base stations of the base station groups via a CDMA radio channel, and in which a plurality of radio frequencies are divided into a first radio frequency group including at least one radio frequency and a second radio frequency group including a plurality of radio frequencies, the at least one radio frequency of the first radio frequency group being assigned in common to all of the base stations belonging to at least one of said plurality of base station groups and the radio frequencies of the second radio frequency group being individually assigned to said plurality of base station groups, the CDMA cellular radio system comprising:

radio frequency assigning means for assigning the at least one radio frequency belonging to the first radio frequency group to the mobile station in preference to the radio frequencies belonging to the second radio frequency group; and first handoff control means for effecting a control operation for soft handoff if a radio frequency assigned to the mobile station belongs to the first radio frequency group when the mobile station moves from a coverage area of a first base station group to a coverage area of a second base station group, and effecting a control operation for hard handoff if the radio frequency assigned to the mobile station belongs to the second radio frequency group when the mobile station moves from the coverage area of the first base station group to the coverage area of the second base station group.

* * * * *

UNITED STATES PATENT AND TRADEMARK OFFICE
CERTIFICATE OF CORRECTION

PATENT NO. : 6,021,123
DATED : February 1, 2000
INVENTOR(S) : Masahiko Mimura

It is certified that error appears in the above-identified patent and that said Letters Patent is hereby corrected as shown below:

In Claim 20, column 19, line 37, "a" has been relaced by --are--.

Signed and Sealed this

Twenty-seventh Day of February, 2001

Attest:

NICHOLAS P. GODICI

Attesting Officer     Acting Director of the United States Patent and Trademark Office